US007395916B2

(12) United States Patent
Gorich et al.

(10) Patent No.: US 7,395,916 B2
(45) Date of Patent: Jul. 8, 2008

(54) APPARATUS AND METHOD FOR MANUFACTURING PANELS FROM WOOD PIECES

(75) Inventors: Thomas Gorich, N. Wilkesboro, NC (US); Lee Kidd, Roaring River, NC (US); Mike Bicio, Union Grove, NC (US); Greg Sprole, Hiddenite, NC (US)

(73) Assignee: Radio Frequency Services, Inc., Wilkesboro, NC (US)

( * ) Notice: Subject to any disclaimer, the term of this patent is extended or adjusted under 35 U.S.C. 154(b) by 0 days.

(21) Appl. No.: 11/146,422

(22) Filed: Jun. 6, 2005

(65) Prior Publication Data

US 2005/0269034 A1 Dec. 8, 2005

Related U.S. Application Data

(62) Division of application No. 10/814,068, filed on Mar. 31, 2004, now Pat. No. 6,918,990.

(51) Int. Cl.
*B65G 29/00* (2006.01)

(52) U.S. Cl. .............. 198/476.1; 198/474.1; 198/803.1; 198/803.7; 414/763

(58) Field of Classification Search ................. 414/763, 414/783, 798.9; 198/377.01, 377.02, 377.03, 198/474.1, 476.1, 478.1, 803.7, 803.9, 803.1
See application file for complete search history.

(56) References Cited

U.S. PATENT DOCUMENTS 1,966,055 A 7/1934 White et al.
3,190,162 A 6/1965 Sonneland
3,620,887 A 11/1971 Nelson
3,627,146 A * 12/1971 Berndt .................... 414/745.9
3,757,927 A * 9/1973 Gable et al. .............. 198/463.5
4,178,455 A 12/1979 Hirai et al.
4,212,699 A 7/1980 Braunschweiler
4,394,899 A * 7/1983 Fluck ......................... 198/408
4,444,077 A 4/1984 Wise et al.
4,547,255 A 10/1985 Yow
4,615,759 A 10/1986 Ota
4,785,698 A 11/1988 Stork
4,788,698 A 11/1988 Kimura et al.
4,928,809 A * 5/1990 Bozza ........................ 198/408
5,161,697 A 11/1992 Quick
5,240,051 A 8/1993 Quick et al.
5,505,812 A 4/1996 Mortoly, Jr. et al.
5,518,106 A * 5/1996 Allard ..................... 198/459.5

(Continued)

*Primary Examiner*—Douglas A Hess
(74) *Attorney, Agent, or Firm*—Alston & Bird LLP

(57) ABSTRACT

An apparatus having several stations that receive, apply adhesive to, crowd, press and cure the wood pieces into a continuous wood panel. A singulation station engages an individual one of the wood pieces oriented in a cross-machine direction from an infeed station, presents the wood piece to an adhesive station for adhesive application and releases the wood piece for crowding at a crowding station into a batch of the wood pieces. A press station downwardly presses the batch with an upper platen and presses the batch in a downstream direction onto the continuous wood panel with a clamping device. A radio frequency device applies radio waves to cure the adhesive between the wood pieces of the batch so as to adhere the wood pieces together and so as to adhere the batch to the continuous wood panel. A cutting station cuts individual wood panels from the continuous wood panel.

15 Claims, 13 Drawing Sheets

U.S. PATENT DOCUMENTS

| | | | | | |
|---|---|---|---|---|---|
| 5,595,102 | A | | 1/1997 | O'Grady | |
| 5,617,622 | A | | 4/1997 | Anderson | |
| 5,752,594 | A | * | 5/1998 | Fournier | 198/803.9 |
| 5,833,222 | A | | 11/1998 | Olden et al. | |
| 5,927,473 | A | * | 7/1999 | Draghetti | 198/474.1 |
| 5,931,287 | A | * | 8/1999 | Fournier | 198/803.9 |
| 5,941,367 | A | * | 8/1999 | Osti et al. | 198/475.1 |
| 6,186,313 | B1 | * | 2/2001 | Spatafora et al. | 198/474.1 |
| 6,702,096 | B2 | * | 3/2004 | Koskovich et al. | 198/459.5 |
| 6,722,494 | B2 | * | 4/2004 | Nakakado | 198/792 |
| 6,769,529 | B2 | * | 8/2004 | Fournier et al. | 198/403 |
| 6,848,566 | B2 | * | 2/2005 | Harnish et al. | 198/459.8 |

* cited by examiner

APPARATUS AND METHOD FOR MANUFACTURING PANELS FROM WOOD PIECES

CROSS-REFERENCE TO RELATED APPLICATION

The present divisional application claims priority from U.S. application Ser. No. 10/814,068 entitled "Apparatus and Method for Manufacturing Panels from Wood Pieces" filed Mar. 31, 2004 now U.S. Pat. No. 6,918,990, which claims benefit to U.S. application Ser. No. 09/938,222 entitled "Apparatus and Method for Manufacturing Panels from Wood Pieces" filed Aug. 23, 2001 now U.S. Pat. No. 6,748, 995, which claims benefit of U.S. Provisional Application No. 60/227,627 entitled "Apparatus and Method for Manufacturing Panels from Wood Pieces" filed Aug. 24, 2000, the contents of which are incorporated herein by reference.

FIELD OF THE INVENTION

The present invention relates to the formation of wood panels from a series of wood pieces, and in particular, relates to apparatus and methods for automatically and continuously adhering the wood pieces together.

BACKGROUND OF THE INVENTION

In the manufacture of various products, such as case goods in the furniture industry, it is often desirable to incorporate one or more premanufactured wooden panels in the design of the product. These panels can be made from a monolithic piece of wood or can be built up from certain discrete layers or plies of wood. Another successful approach to forming wood panels involves adhering together a collection of boards having a rectangular cross-section in an edge-to-edge configuration. For example, wooden boards having a thickness of one inch and a width of two inches can be adhered together along their narrower edges to create a panel such as the top of a kitchen table. Another example of panel made from wood pieces is a raised panel of a cabinet door.

Various apparatus have been proposed for automatically creating panels made from adhered wood pieces. For example, U.S. Pat. No. 5,240,051 discloses a dual automated clamp carrier for gluing together panels of wood from wood panel segments. The machine includes a plurality of clamp racks in which panels are clamped so that the individual panel segments can be glued together. For example, as noted in connection with the embodiment of FIG. 11, the panels are assembled manually by an operator who first must lift a completed panel from a clamp rack and then stack new panel segments into the clamps on the clamp rack to layout a new panel. (Col. 8, lines 39-41). However, a disadvantage of this approach is that the panels must first be assembled by an operator, which undesirably involves manual labor costs and the risk that the operation will become messy because the operator must handle boards having a wet adhesive applied thereto. In addition, the apparatus can only create panels of limited width (as determined by the spacing of the clamps) and does not provide for the continuous manufacture of wood paneling material.

An improvement on this conventional apparatus is embodied in a continuous gluer machine available from Radio Frequency Services, Inc. in Wilkesboro, N.C. In particular, the model CG/RF includes an infeed system for a press that allows continuous production of wooden panels. Wood pieces are supplied from the infeed system with an adhesive applied to a leading edge of the wood piece. Within the press, the leading edge of a wood piece is pressed against the trailing edge of the immediately preceding wood piece. The immediately preceding wood piece is securely clamped and held stationary while the subsequent wood piece with the adhesive applied thereto is pressed against the preceding wood piece. The adhesive is then cured to form a secure bond. Advantageously, the adhesive is curable by way of a radio frequency energy field and the apparatus includes a radio frequency generator as part of the press, which rapidly and securely cures the adhesive between the wood pieces. Thus, the model CG/RF allows the production of a "continuous ribbon" of wood panel material comprising a series of wood pieces adhered together at their edges.

While the model CG/RF has provided great advantages over conventional apparatus, the infeed system requires that the individual wood pieces be moved transversely to the machine direction when applying the adhesive to the edges of the wood pieces. An adhesive extruder is provided adjacent the main conveyor and each wood piece is fed laterally to the conveyor such that a leading edge of the wooden piece is passed along the adhesive extruder and adhesive is applied thereto. However, in the model CG/RF, wood pieces are supplied to the conveyor in a transverse direction, which can consume potentially valuable floor space adjacent the side of the conveyor. In addition, as would be appreciated by one of ordinary skill in the art, the adhesive application process is dependent on the length of the wood piece in question, which might not provide sufficient line speed.

Another limitation on conventional apparatus relates to subsequent cutting of the wood panels to a desired size. For example, conventional cutting apparatus include a saw capable of cutting in a cross-machine direction to create panels of a predetermined width from the continuous ribbon of wood panel material as the material exits the press. However, in machines that make a single ribbon of wood paneling material, these saws are not capable of easily and quickly being adjusted to cut off panels of varying widths. The ability to cut panels of different predetermined widths at an acceptable manufacturing speed would be highly desirable.

Thus, there is a need in the industry for an apparatus and method that provide continuous production of wooden panels from a series of adhered wood pieces. Such an apparatus would not only allow continuous manufacture of these panels, but would also eliminate the need to supply wood pieces transversely to the main conveyor and would provide automatic application of the adhesive to the edges of the wood pieces. In addition, such an apparatus would also preferably be capable of cutting off panels from the continuous panel material that have different predetermined widths, and would do so at manufacturing speeds.

SUMMARY OF THE INVENTION

The present invention addresses the above needs and achieves other advantages by providing an apparatus and method for manufacturing panels from wood pieces. The apparatus includes several stations that receive, apply adhesive to, crowd, press and cure the wood pieces into a continuous wood panel. In particular, a singulation station is configured to engage an individual one of the wood pieces oriented in a cross-machine direction from an infeed station, present the wood piece to an adhesive station for adhesive application and release the wood piece for crowding at a crowding station into a batch of wood pieces. A press station downwardly presses the batch with an upper platen and further presses the batch in a downstream direction onto the continuous wood panel by extending a clamping device onto an upstream end of the batch. A radio frequency device of the press station applies radio waves to cure the adhesive between the wood pieces of the batch so as to adhere the wood pieces together and so as to adhere the batch to the continuous wood panel. A cutting station cuts predetermined lengths of individual wood panels from the continuous wood panel.

In one embodiment, the present invention includes an apparatus for adhering a plurality of variable-width wood pieces into a continuous wood panel from which can be cut a plurality of individual wood panels. The apparatus defines a machine direction and includes an infeed station, an adhesive application station, and a singulation station. The infeed station is configured to receive the wood pieces such that the wood pieces are oriented in a cross-machine direction. An adhesive applicator of the adhesive application station is capable of applying adhesive to a side of a wood piece. The singulation station is positioned in proximity to the infeed station and includes an engagement mechanism. The engagement mechanism is configured to engage one of the wood pieces oriented in the cross-machine direction at the infeed station. Further, the engagement mechanism is configured to present the wood piece to the adhesive application station. Presentation of the wood piece to the adhesive application station allows application of the adhesive to the wood piece so that the side of the wood piece to which the adhesive is applied can be adhered to an adjoining wood piece, thereby forming at least part of the continuous wood panel.

In another aspect, the engagement mechanism includes a gripper assembly that has at least one gripper with a plurality of fingers configured to open and close about one of the wood pieces. Preferably, the gripper assembly includes a shaft and the gripper is attached to the shaft. The shaft is rotatable to a first position wherein the gripper is positioned to grip the wood piece from the infeed station. The shaft is also rotatable to a second position, wherein the gripper is positioned to present the wood piece to the adhesive application station for adhesive application. More preferably, the shaft is further rotatable to a third position wherein the gripper is positioned to release the wood piece into a crowding station while maintaining orientation of the wood piece in the cross-machine direction.

In still another aspect, the gripper assembly includes four grippers positioned circumferentially about the shaft spaced 90° apart. In such a configuration, any three of the four grippers can be simultaneously, rotatably positioned at the first, second and third positions, respectively, by the shaft. Four circumferentially spaced grippers can be grouped in a set, and several sets spaced along a length of the rotatable shaft for gripping wood pieces of variable length.

In yet another aspect, the adhesive application station further includes a gantry beam extending in the cross-machine direction above the singulation station. The adhesive applicator is mounted on the beam for powered sliding movement in the cross-machine direction along a longitudinal edge of the wood piece presented by the singulation station for adhesive application. Preferably, the adhesive applicator is further mounted for powered movement toward and away from the longitudinal edge of the wood piece presented by the singulation station. Further preferably, the adhesive applicator is an adhesive extruder.

In another embodiment, the present invention includes a crowding station positioned downstream from the adhesive application station. The crowding station includes an upstream crowding device and a downstream crowding device. Crowding of the wood pieces into a batch is accomplished by moving the crowding devices together with the wood pieces between them.

In another aspect, the crowding station further comprises a conveying surface that includes an array of parallel slats oriented in the machine direction and defining an array of parallel openings therebetween. The upstream crowding device includes a plurality of pusher fingers at spaced intervals corresponding to the array of the openings. Pushing of the batch downstream is accomplished by interdigitating the pusher fingers into the array of openings and against the upstream edge of the batch. The downstream crowding device includes a plurality of restraining fingers corresponding to the array of openings. Restraining of the batch against the pushing of the upstream device is accomplished by interdigitating the pusher fingers into the array of openings against the downstream edge of the batch of wood pieces.

In yet another embodiment, the present invention includes a press station having an upper platen and a clamping device. The upper platen is positioned to be downwardly moveable onto the batch of wood pieces and the clamping device is configured to clampingly engage edges of the batch of wood pieces. Preferably, the clamping device includes a plurality of offset clamping bars. The offset clamping bars each have a portion extending below a lower surface of the upper platen and have attached thereto a respective one of a plurality of clamping blocks. Clamping engagement of the upstream edge of the batch of wood pieces is accomplished by actuating the clamping bars so as to move the clamping blocks in a downstream direction. In another aspect, the clamping device further includes a plurality of hydraulic cylinders positioned above the lower surface of the upper platen. The hydraulic cylinders are connected to respective ones of the clamping bars and are operative to actuate the clamping bars. Preferably, the clamping station also includes a radio frequency curing device for curing the adhesive.

Thus, the present invention provides a completely automated apparatus and method for adhering together a number of random width wood pieces quickly and efficiently. Further, the continuous ribbon of wood pieces thus created can be cut to any number of desired widths for various components. As an example, the base of a drawer may be first cut having a width of 12 inches followed by two sides each having a width of 6 inches so that a subsequent assembly operation can complete the manufacture of the drawer.

BRIEF DESCRIPTION OF THE DRAWINGS

Figure 1:
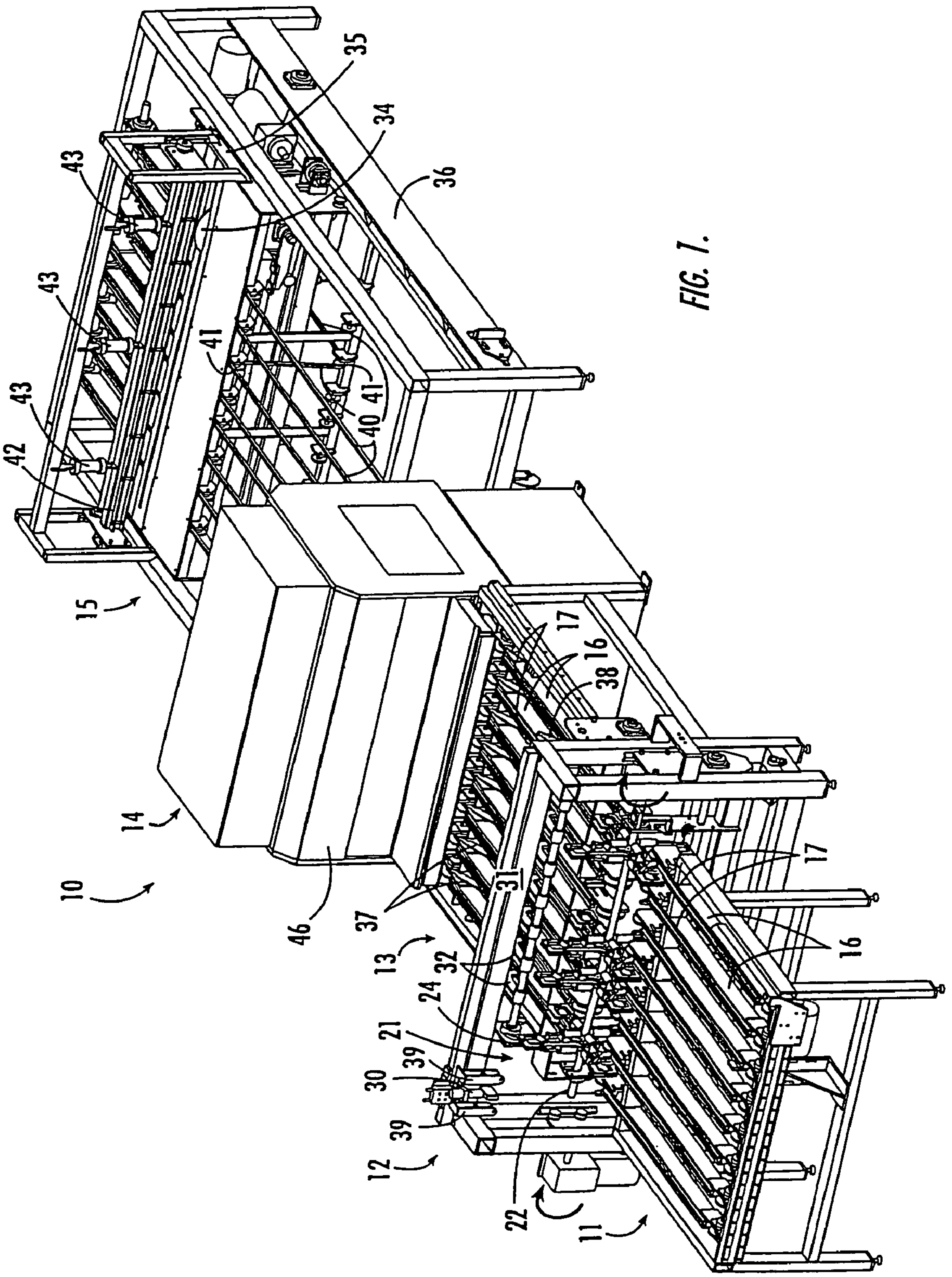
Figure 2:
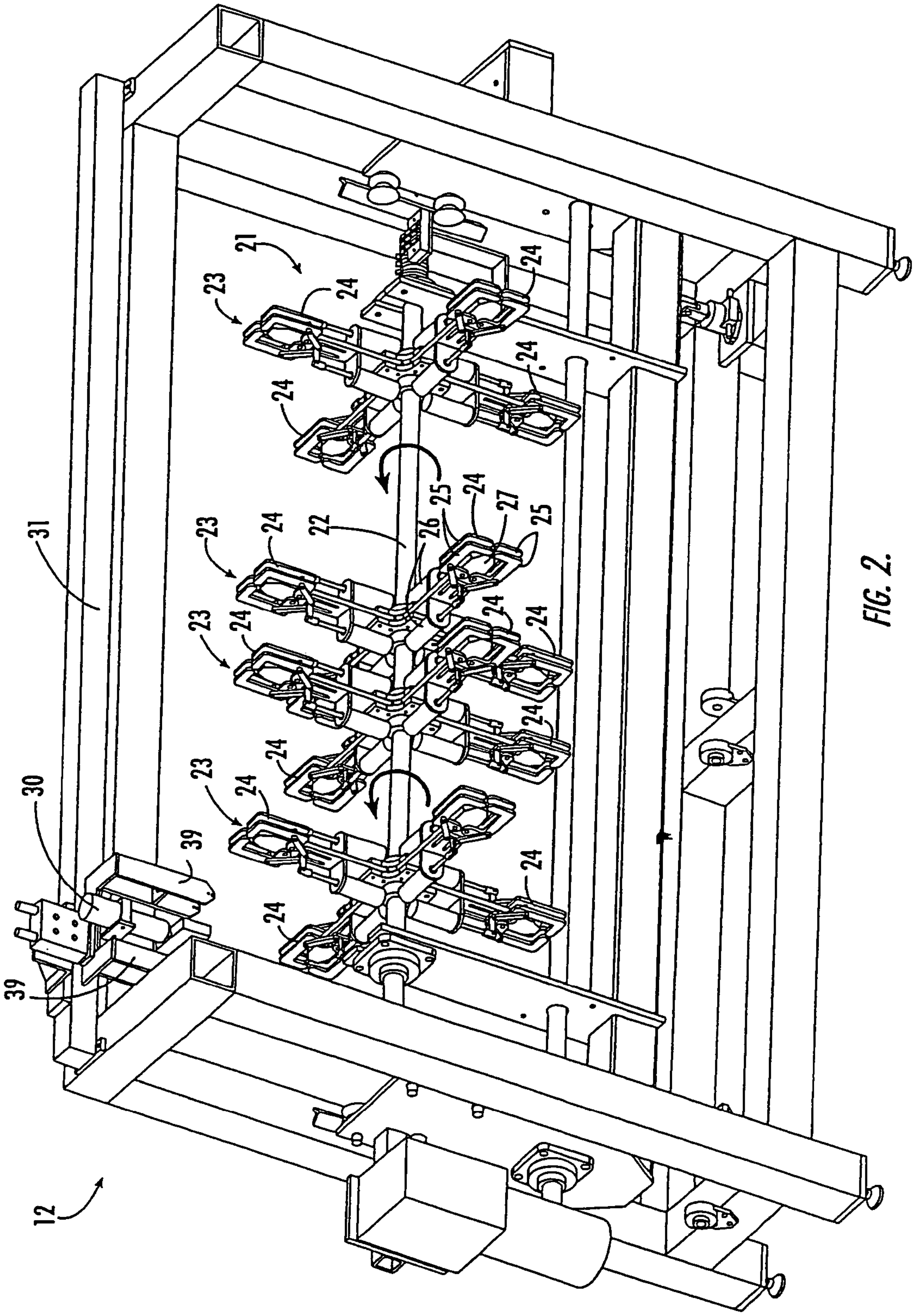
Figure 3:
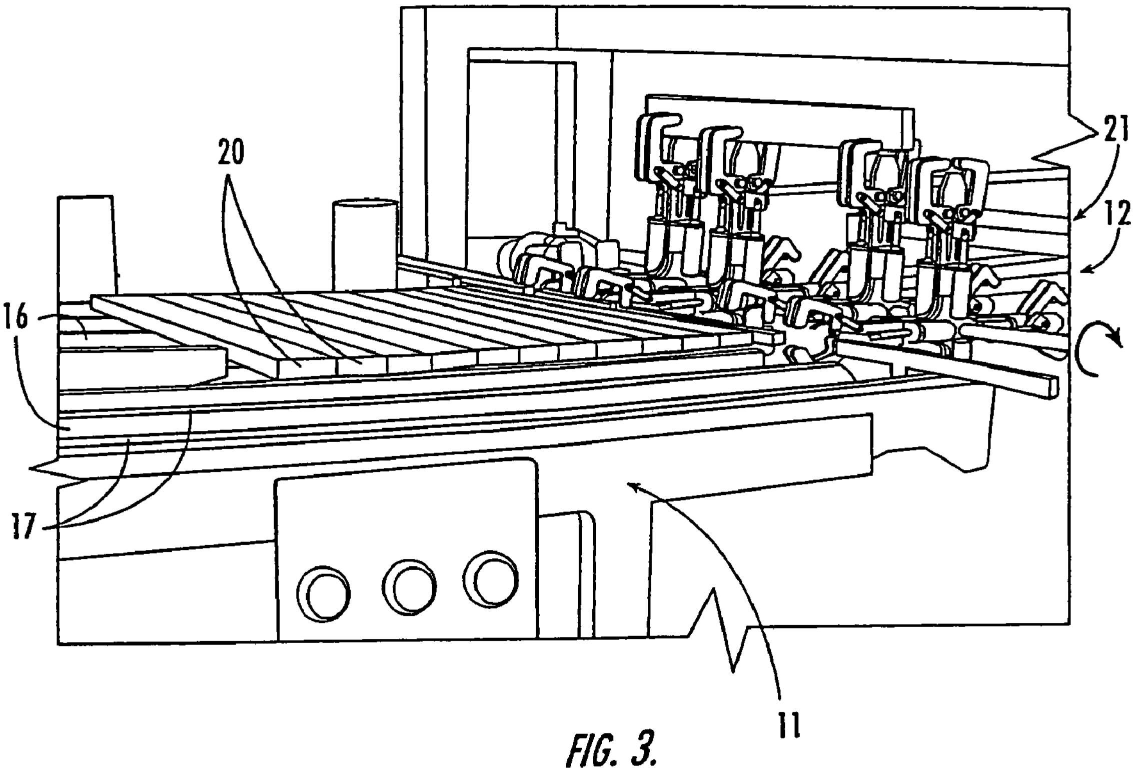
Figure 4:
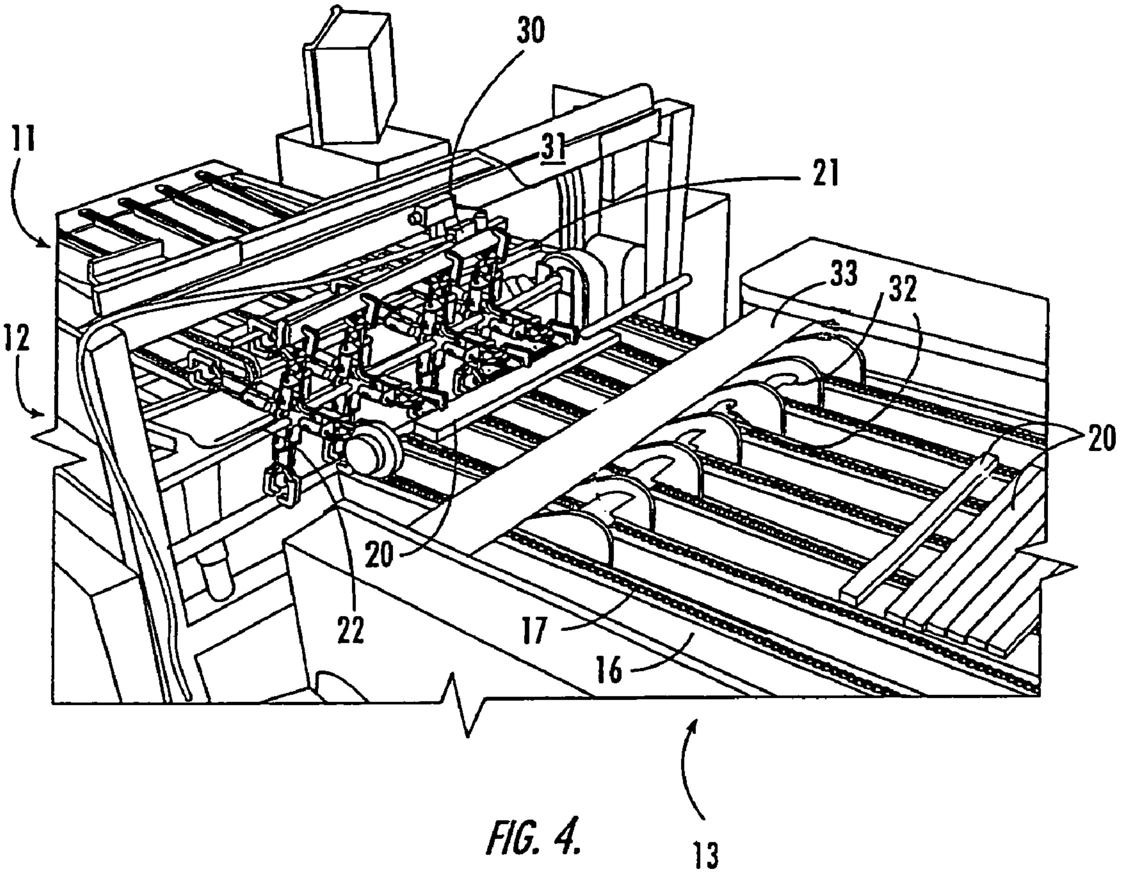
Figure 5:
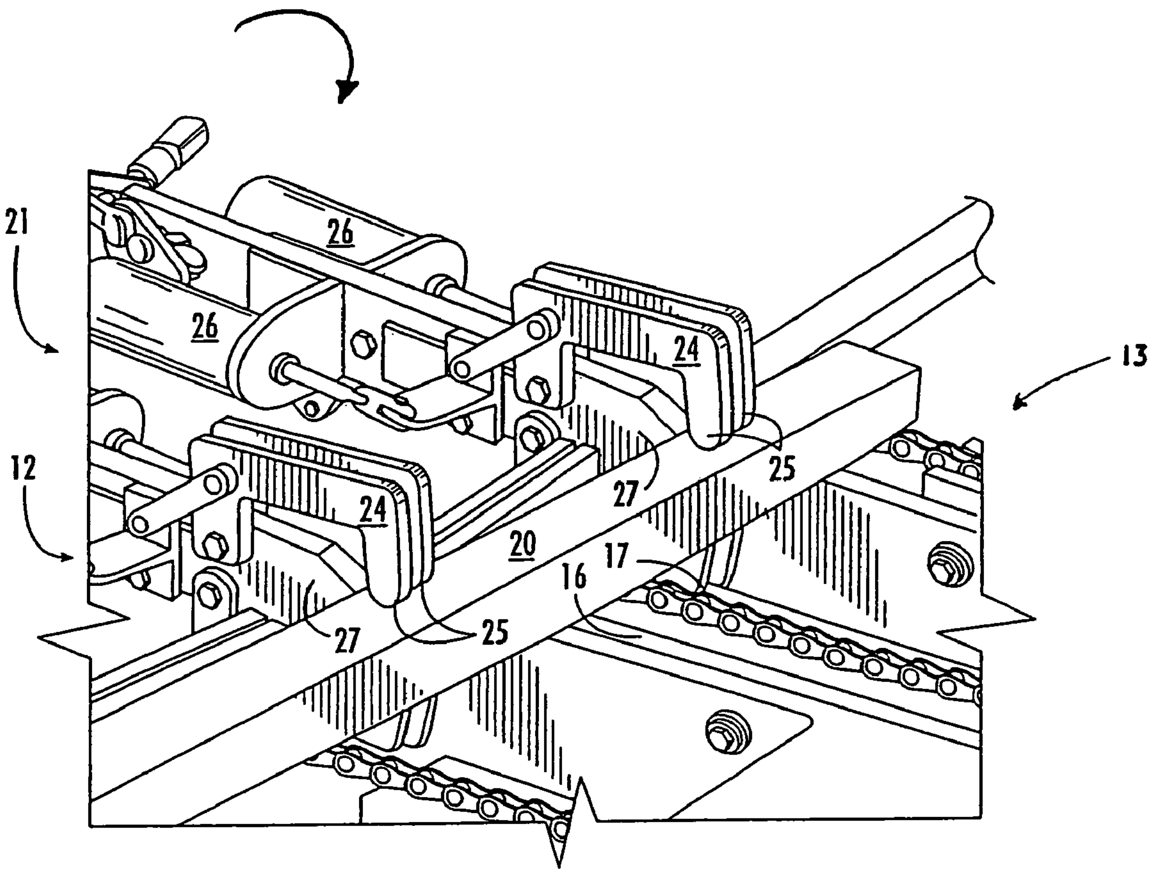
Figure 6:
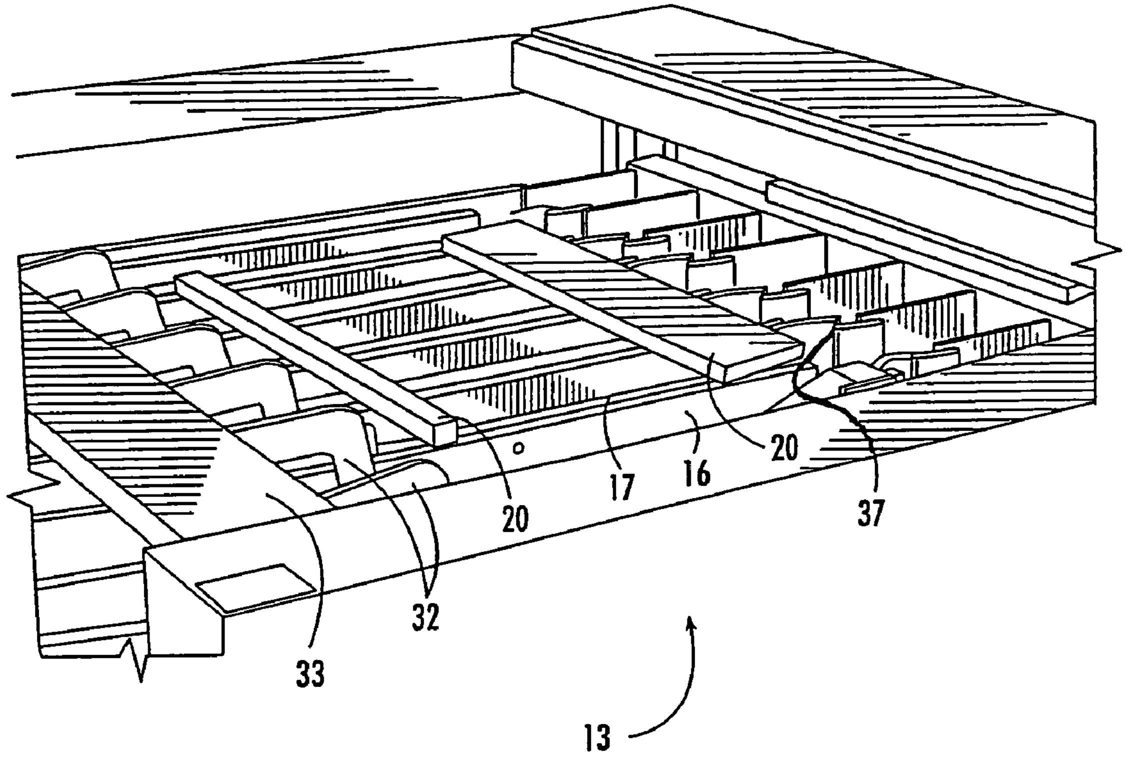
Figure 7:
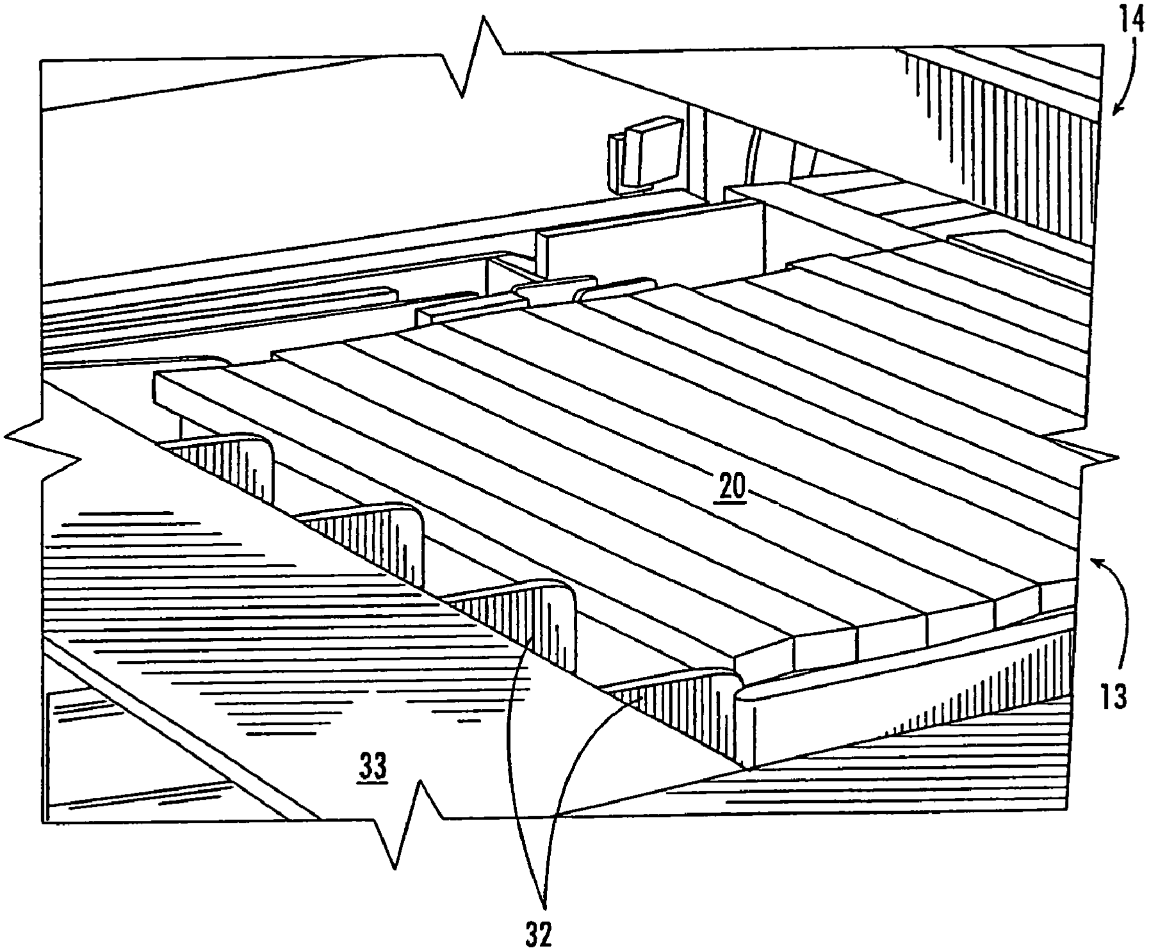
Figure 8:
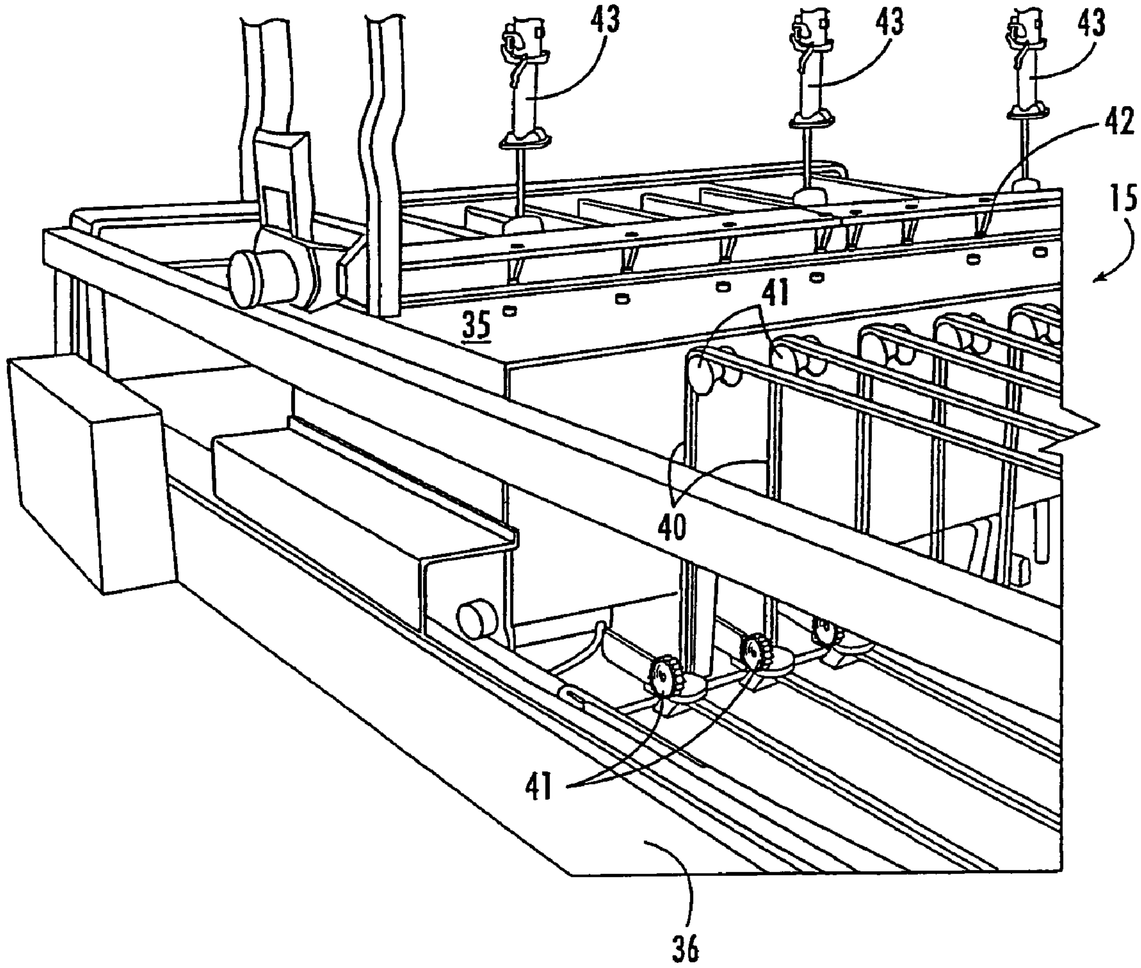
Figure 9:
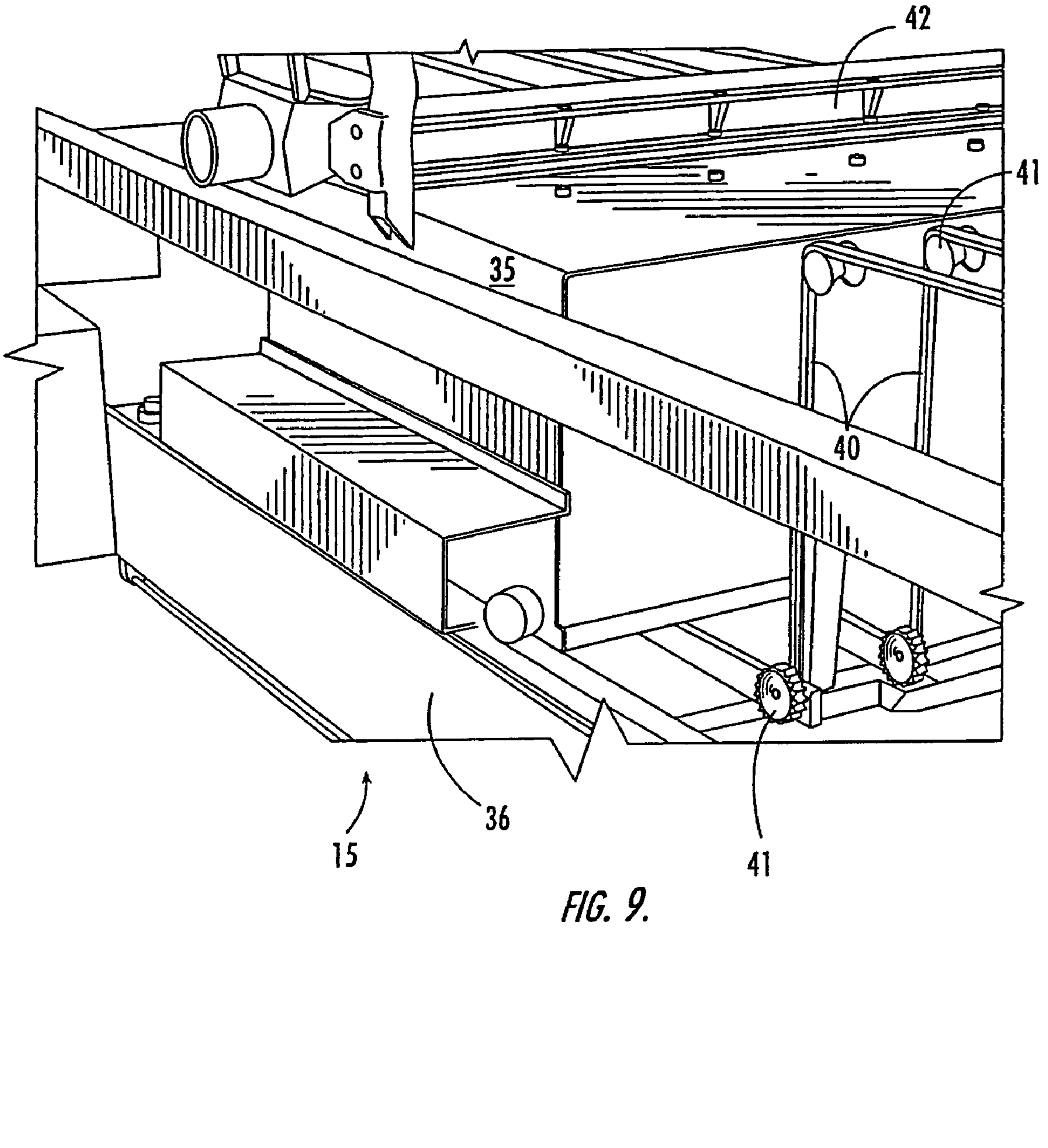
Figure 10:
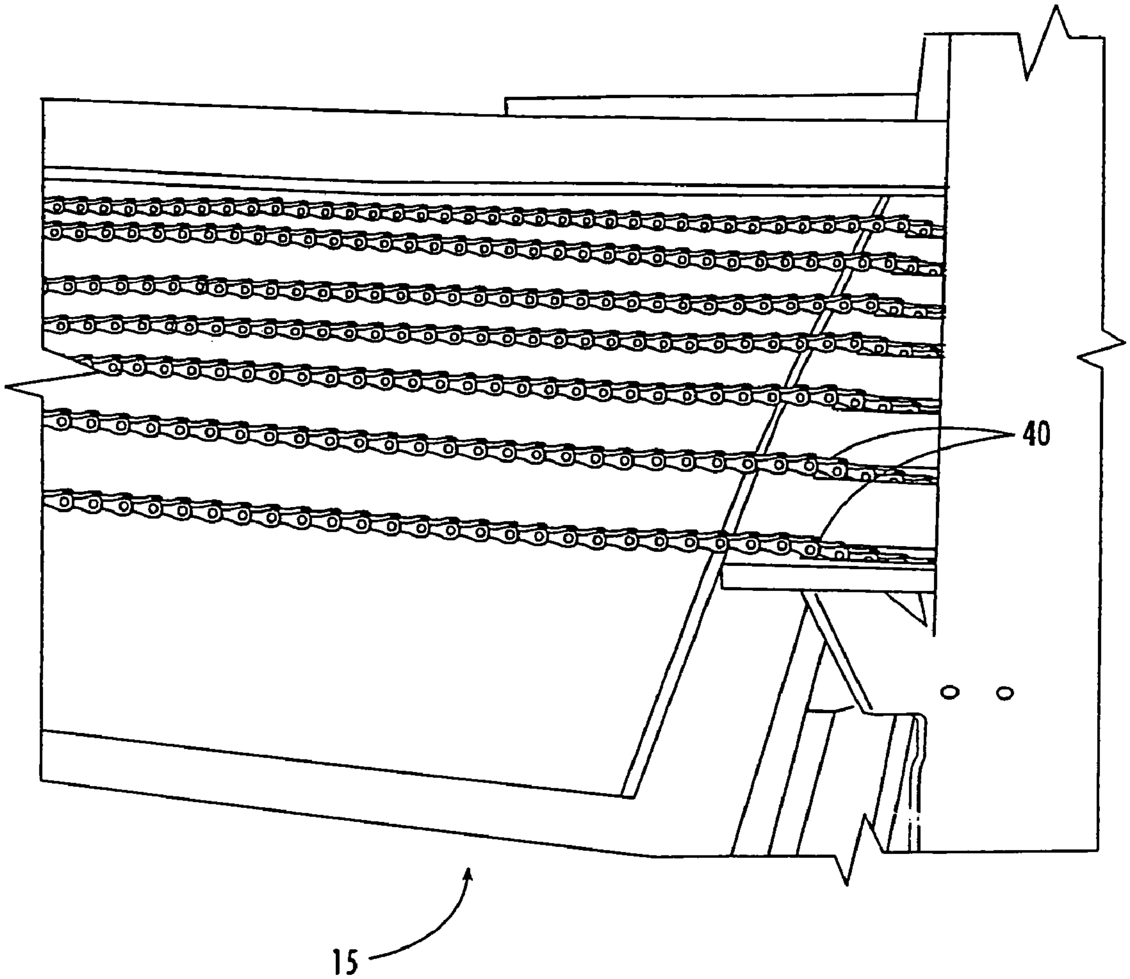
Figure 11:
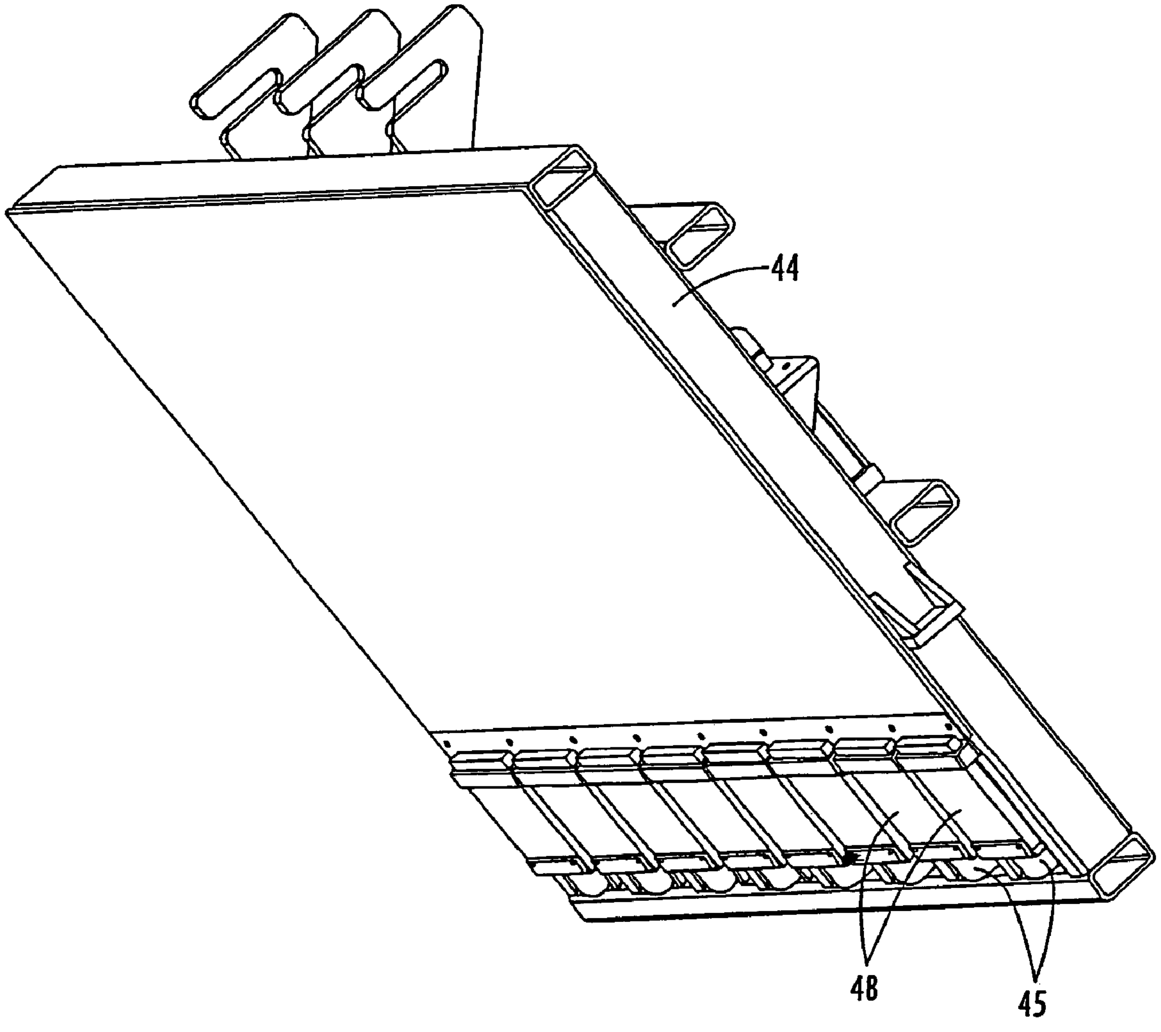
Figure 12:
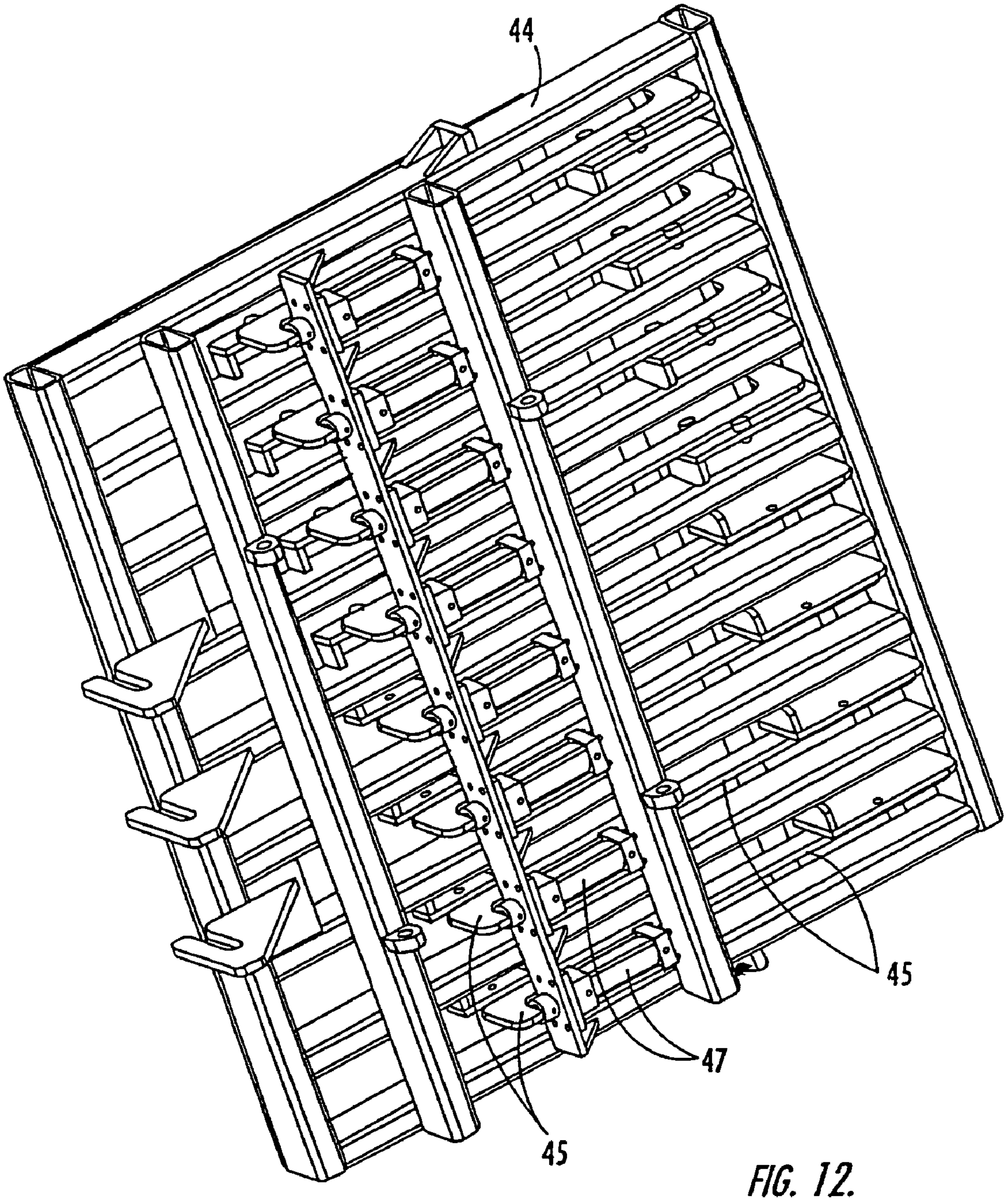

Having thus described the invention in general terms, reference will now be made to the accompanying drawings and views, which are not necessarily drawn to scale, and wherein:

FIG. 1 is a perspective view of the apparatus according to the present invention;

FIG. 2 is an enlarged perspective view of a singulation and adhesive application station;

FIG. 3 is perspective view of an infeed station and rotary transfer arm;

FIG. 4 is a perspective view of the singulation and adhesive application station and also a crowding station;

FIG. 5 is an enlarged perspective view of a pair of grippers;

FIG. 6 is a perspective view of the crowding station;

FIG. 7 is an enlarged perspective view of the crowding station illustrating the crowding of a batch of wood pieces;

FIG. 8 is a perspective view of a cutting station according to the present invention;

FIG. 9 is an enlarged perspective view of a cutting gantry at the cutting station;

FIG. 10 is a perspective view of a downstream end of a gantry frame illustrating a plurality of suspended conveyor chains;

FIG. 11 is a perspective view of the underside of an upper platen in the press station;

FIG. 12 is a perspective view of the upper side of the upper platen; and

Figure 13:
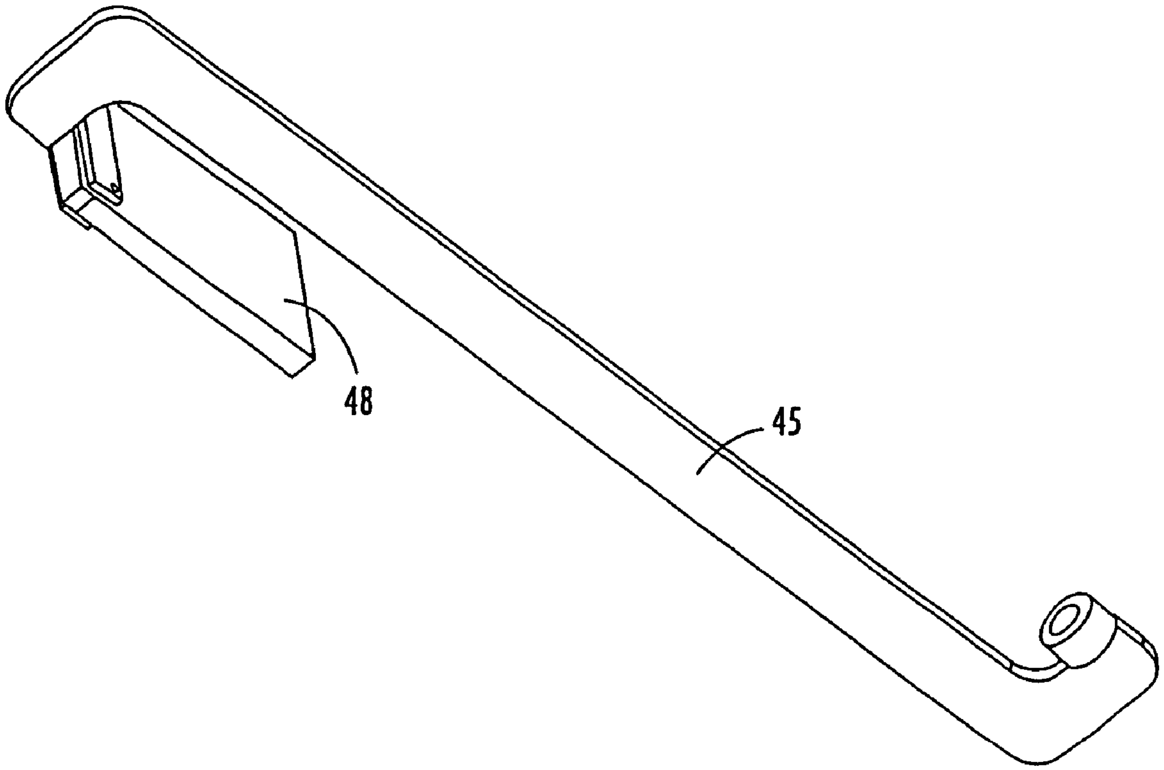

FIG. 13 is a perspective view of an offset clamping bar.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

These and other objects and advantages are achieved by the present invention which provides an automated apparatus and method for singulating and gripping the wood pieces and then applying an adhesive along an edge thereof before crowding the pieces together and adhering them in a press. Further, the apparatus and methods of the invention provide the capability of cutting off panel widths of individually selected widths by way of a saw mechanism that can travel in the machine direction relative to the press.

FIG. 1 is a perspective view of the apparatus 10 according to the present invention. The apparatus 10 includes various stations for practicing the method according to the present invention including an infeed station 11, a singulation and adhesive application station 12, a crowding station 13, a press station 14, and a cutting station 15.

As can be seen in FIG. 1, the infeed station 11 includes a plurality of slats 16 extending in a machine direction and a plurality of conveyor chains 17 that are advanced along the top of the slats to form a conveying surface. As can be seen in FIG. 3, a collection of wood pieces 20 is placed on the conveyor chains 17 at the infeed station 11. The wood pieces 20 can be placed on the conveyor chains 17 either manually by an operator or by some automated device at the upstream end of the infeed station 11. It is not necessary that the wood pieces 20 are moved onto the conveyor chains 17 laterally and the wood pieces can be placed in the machine direction onto the upstream end of the infeed station. Also, the wood pieces 20 are placed onto the conveyor chains 17 in a dry state before any adhesive has been applied, thus preventing messy drips, smears and the like of adhesive onto the faces of the wood pieces or the machinery.

The wood pieces 20 can be in the form of boards of random width and typically range from 1.25 inches up to 3.5 inches. The wood pieces 20 are typically uniform in thickness and can range from 0.75 inches to 2 inches thick. The wood pieces 20 are advanced to the end of the infeed station 11 by way of the conveyor chains 17 where they are individually presented to the singulation and adhesive application station 12.

One advantageous feature of the present invention is the singulation and adhesive application station 12. For singulating the wood pieces 20 (i.e., individually addressing and processing the wood pieces 20) the present invention includes a rotary transfer mechanism 21 that has a rotary shaft 22. The rotary shaft 22 includes a plurality of gripper sets 23, each of which includes a plurality of grippers 24 for gripping the wood pieces 20. In the embodiment illustrated, the rotary shaft 22 supports four gripper sets 23, each of which includes four grippers 24. The embodiment illustrated is usable with wood pieces having a length up to 60 inches. However, it will be understood that the length of the wood pieces can vary and that the apparatus can be adjusted to accommodate different lengths, such as through the addition or subtraction of gripper sets 23 on the rotary shaft 22.

As can be most clearly in FIG. 2, each of the grippers 24 includes opposing pairs of pivotable fingers 25 that can be selectively opened and closed by retracting or extending a pair of cylinders 26. The grippers are also provided with stops 27 that prevent the wood pieces 20 from extending too far in between the fingers 25.

Positioned over the rotary transfer mechanism 21 is an adhesive applicator 30, which is slidably mounted on a beam 31. The adhesive applicator 30 is connected to a source of adhesive (not shown) and is capable of traversing the beam 31 to apply adhesive to an edge of a wood piece 20 when oriented vertically subjacent to the adhesive applicator 30 by the rotary transfer mechanism 21, as discussed in more detail below. The adhesive is preferably a radio frequency curable adhesive of a type known in the industry.

Thus, in operation, the wood pieces 20 are sequentially presented to the rotary transfer mechanism 21. The grippers 24 of each gripper set that face horizontally and upstream (i.e., those in the 9 o'clock position when viewed from the right-hand side of the machine) are closed by actuation of the cylinders 26. The wood pieces 20 are held by the fingers 25 and against the stops 27. The rotary transfer mechanism 21 is then rotated 90° in the clockwise direction (again when viewed from the right-hand side of the machine) so that the wood piece 20 is presented in a vertical configuration below the adhesive applicator beam 31. The rotary transfer mechanism 21 is momentarily stopped and the adhesive applicator 30 is traversed across the beam 31 to apply adhesive along the entire upper edge of the wood piece 20. One or more sensors 39 are provided in conjunction with the adhesive applicator 30 to sense the distance between the applicator and the edge of the wood piece so that the adhesive application can be adjusted accordingly by raising or lowering the applicator. The adhesive applicator 30 is preferably an adhesive extruder.

After the adhesive has been applied, the rotary transfer mechanism 21 is again rotated in a clockwise direction by 90° so that the wood pieces are presented to the crowding station 13. The grippers 24 are then released and the wood pieces 20 are free to travel through the crowding station 13. Of course, it will be appreciated that the grippers 24 of each set 23 in each of the 9 o'clock, 12 o'clock and 3 o'clock positions operate simultaneously such that two or three wood pieces 20 are always engaged by the rotary transfer mechanism 21. One advantage of the singulation and adhesive application station 12 of the present invention is that no manual handling of the wood pieces 20 is required during the adhesive operation and, further, the wood pieces are not required to be moved transversely with respect to the machine direction for the adhesive to be applied. In the present invention, the entire adhesive application process is automated.

At the crowding station 13 the wood pieces 20 are conveyed on further conveyor chains 17 which run along the top of respective slats 16. As can be best seen in FIGS. 4, 6 and 7, the wood pieces 20 are crowded together at the crowding station 13 such that the leading edge of each wood piece, to which the adhesive was applied by the adhesive applicator 30, is abutted against the trailing edge of the immediately preceding wood piece 20. The wood pieces 20 are restrained on the conveyor chains 17 by a downstream set of pivotable restraining fingers 37 mounted under the top surface of the slats 16. After a batch has been accumulated, the restraining fingers 37 are pivoted downwardly and the batch is pushed into the press station 14 by a set of pusher fingers 32.

The pusher fingers 32 are mounted on a beam 33 which provides for rotation of the pusher fingers about an axis parallel to the beam so that, when pivoted upwardly, the pusher fingers and beam allow wood pieces 20 to pass thereunder while a batch is being accumulated. The pusher fingers 32 can then be rotated downwardly between the slats 16 and the beam 33 is advanced downstream in the machine direction which causes the pusher fingers to engage the wood pieces 20 and crowd the wood pieces 20 together at the press station 14.

The pusher fingers 32 advantageously square each batch of wood pieces after the batch has entered the press station 14. Certain of the wood pieces do not have exactly parallel edges and thus have a tapered profile. Thus, if enough successive wood pieces are tapered in the same direction, it is possible in conventional machines to affect the alignment of the resultant ribbon of wood paneling material and the ribbon can have an undesirable curved shape when viewed from above. The present invention is not susceptible to such cumulative errors, however, because the pusher fingers 32 ensure proper alignment of each batch individually.

The press station is provided with an upstream set of pivotable restraining fingers 38 also mounted under the top surface of the slats 16. The upstream restraining fingers 38 act in concert with the downstream restraining fingers 37 in an escapement fashion to ensure that the wood pieces 20 are all properly batched.

In the press station 14 the wood pieces 20 are held tightly together while a radio frequency field is applied to the wood pieces 20 A device as illustrated in FIGS. 11-13 is used to clamp the wood pieces 20 together in the press station 14 and includes an upper platen 44 having a generally flat lower surface, as can be seen most clearly in FIG. 11. The upper platen 44 can be raised and lowered onto the wood pieces under the hood 46 of the press station 14. The upper platen 44 supports on its upper surface a plurality of hydraulic cylinders 47 that are each operatively connected to a respective offset clamping bar 45. At the opposite end of each offset clamping bar 45 is a clamping block 48 that is configured to engage one of the end wood pieces in each batch. Opposite fixed clamping blocks (not shown) are also supported on the upper platen 44 and are engaged by the other of the end wood pieces. After the batch of wood is in the press station 14, the hood 46 and upper platen 44 are lowered and the clamping blocks straddle both ends or sides of the batch of wood. The hydraulic cylinders 47 are then activated which apply the desired clamping pressure to the wood pieces while the adhesive is cured. This pressure can be in the range of 150-200 psi. An advantage of this arrangement is that the hydraulic cylinders are arranged above the upper platen, which is unlike some conventional apparatus that arrange the cylinders to one side or the other of the wood batch and which entails the use of additional floor space to avoid interference with the feeding mechanism.

The radio frequency field is created by a radio frequency generator (not shown) that causes the radio frequency curable adhesive to cure quickly, typically within a matter of seconds. Radio frequency cured adhesives are conventional in the art and are not explained further herein. However, it should be noted that, as each batch of wood pieces 20 is accumulated in the crowding station, the trailing edge of one batch is adhered to the leading edge of a subsequent batch. More particularly, the wood piece at the trailing end of the batch in the press station 14 is briefly clamped in place while the wood piece at the leading end of the subsequent batch is pressed thereagainst by the pusher fingers 32. In this manner, even though the radio frequency field preferably is generated intermittently for successive batches of wood pieces, it is possible to create a continuous ribbon of wood pieces exiting from the downstream end of the press station 14.

Another advantageous feature of the present invention is the cutting station 15 which includes a rotary saw blade 34 for cutting from under the wood in a cross-machine direction, as is best seen in FIG. 1. The saw blade 34 is mounted for movement in the cross-machine direction on a gantry 35 and may be provided with a dust chute for removal of sawdust. The gantry 35 is itself movable along a gantry frame 36 in the machine direction. The saw blade 34 and gantry 35 are operatively connected to a processor that allows selected panels to be cut to desired widths. In other words, the gantry 35 is moved back and forth along the frame 36 to a position corresponding to the desired width of a panel and the saw blade 34 is then moved transversely to the machine direction to cut the desired panel width.

The cutting station 15 is provided with parallel conveyor chains 40 that extend in the machine direction and are also movable in the downstream direction. However, the conveyor chains 40 in the cutting station 15 do not ride along the top of slats but are instead drawn relatively tightly between the upstream and downstream ends of the gantry frame 36. Guide wheels 41 are provided at the corners of the gantry 35 and allow the conveyor chains 40 to be routed underneath and around the gantry 35. In this fashion, the gantry 35 can be moved entirely independently of the conveyor chains 40 and the wood pieces 20 will always be supported throughout their travel through the cutting station 15 by the conveyor chains.

A guard 42 travels on the gantry 35 above the saw blade 34 and protects operators and personnel from contact with the saw blade. The guard 42 also serves a function of holding the ribbon of wood pieces firmly against the gantry during the sawing operation. A plurality of cylinders 43 is provided for raising and lowering the guard 42 when access to the saw blade is desirable and/or the cut wood panels are to be released. In FIGS. 8 and 9 the cylinders 43 and guard 42 are shown in a lowered position whereas in FIG. 1 the cylinders and guard are shown in a raised position. At the end of cutting station 15, the manufactured panels can be removed and conveyed to finishing operations such as planing, sanding, staining, etc.

Thus, the present invention provides a completely automated apparatus and method for adhering together a number of random width wood pieces quickly and efficiently. Further, the continuous ribbon of wood pieces thus created can be cut to any number of desired widths for various components. As an example, the base of a drawer may be first cut having a width of 12 inches followed by two sides each having a width of 6 inches so that a subsequent assembly operation can complete the manufacture of the drawer.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rotary transfer mechanism for transferring individual four-sided wood pieces from an infeed station to a crowding station, and for presenting the individual wood pieces to an adhesive application station to form a panel, the rotary transfer mechanism comprising:

a rotatable shaft;

a drive mechanism operably connected to the rotatable shaft; and a gripper assembly including at least one gripper attached to the rotatable shaft, the rotatable shaft being rotatable between a first position, wherein the gripper is positioned to grip one of the wood pieces from the infeed station, and a second position, wherein the gripper is positioned to present the wood piece to the adhesive application station for adhesive application, wherein the gripper comprises a pair of fingers configured to engage respective first and second opposing surfaces of the wood piece and a stop configured to engage a third surface of the wood piece transverse to the first and second surfaces such that the gripper is capable of gripping wood pieces having fourth surfaces at different distances from the third surfaces, and wherein the gripper assembly further comprises a pair of cylinders each configured to actuate a respective one of the pair of fingers to open and close the fingers.

2. A rotary transfer mechanism of claim 1, wherein the plurality of fingers are configured to open and close about the wood piece to engage the first and second surfaces.

3. A rotary transfer mechanism of claim 1, wherein the rotatable shaft is further rotatable to a third position, and wherein the gripper is positioned to release the wood piece to the crowding station while maintaining a longitudinal axis of the wood piece parallel to an axis of rotation of the rotatable shaft.

4. A rotary transfer mechanism of claim 1, wherein the gripper assembly includes four grippers positioned circumferentially about the rotatable shaft.

5. A rotary transfer mechanism of claim 4, wherein the four grippers are circumferentially spaced 90° apart, so that any three of the four grippers can be simultaneously, rotatably positioned at the first, second and third positions, respectively, by the rotatable shaft.

6. A rotary transfer mechanism of claim 1, further comprising a plurality of gripper assemblies attached to the rotatable shaft, wherein each of the gripper assemblies includes at least one gripper configured to grip one of the wood pieces at the first position and present the wood piece at the second position.

7. A rotary transfer mechanism of claim 1, wherein the at least one gripper is configured to present the wood piece at the second position which is rotated 90° from the first position.

8. A rotary transfer mechanism of claim 7, wherein the at least one gripper is configured to present the wood piece at a third position at the crowding station which is rotated 90° from the second position.

9. A rotary transfer mechanism of claim 1, wherein the at least one gripper is configured to grip the wood piece at the first position and present the wood piece at the second position while maintaining a longitudinal axis of the wood piece parallel to an axis of rotation of the rotatable shaft.

10. A method for transferring individual four-sided wood pieces from an infeed station to a crowding station, and for presenting the individual wood pieces to an adhesive application station to form a panel, the method comprising:

gripping one of the wood pieces from the infeed station with at least one gripper at a first position, wherein the gripper comprises a plurality of fingers configured to engage first and second opposing surfaces of the wood piece and a stop configured to engage a third surface of the wood piece transverse to the first and second surfaces such that the gripper is capable of gripping wood pieces having fourth surfaces at different distances from the third surfaces;

rotating the at least one gripper to a second position; and presenting the wood piece to the adhesive application station for adhesive application while being gripped by the gripper at the second position, wherein presenting comprises stopping the rotation of the at least one gripper at the second position.

11. The method of claim 10, further comprising rotating the at least one gripper to a third position and positioning the gripper to release the wood piece to the crowding station while maintaining a longitudinal axis of the wood piece parallel to an axis of rotation of the gripper.

12. The method of claim 10, wherein each of the gripping, rotating, and presenting steps occurs while maintaining a longitudinal axis of the wood piece parallel to an axis of rotation of the gripper.

13. The method of claim 10, wherein gripping comprises gripping one of the wood pieces with a plurality of grippers at the first position.

14. The method of claim 10, wherein rotating comprises rotating the at least one gripper 90° from the first position.

15. The method of claim 14, further comprising rotating the wood piece 90° from the second position to a third position and presenting the wood piece at the third position at the crowding station.

* * * * *

UNITED STATES PATENT AND TRADEMARK OFFICE

CERTIFICATE OF CORRECTION

PATENT NO. : 7,395,916 B2
APPLICATION NO. : 11/146422
DATED : July 8, 2008
INVENTOR(S) : Gorich et al.

It is certified that error appears in the above-identified patent and that said Letters Patent is hereby corrected as shown below:

Title page,
Item (62), Related U.S. Application Data, after "now Pat. No. 6,918,990", delete "." and insert the following:
--; which is a divisional of application No. 09/938,222, filed on August 23, 2001, now Pat. No. 6,748,995; which claims benefit to application No. 60/227,627, filed on August 24, 2000--.

Column 1,
Lines 11 and 12, "which claims benefit to" should read --which is a divisional of--.

Signed and Sealed this

Thirtieth Day of December, 2008

JON W. DUDAS
*Director of the United States Patent and Trademark Office*